(12) United States Patent
Lu et al.

(10) Patent No.: US 12,240,347 B2
(45) Date of Patent: Mar. 4, 2025

(54) SYSTEMS AND METHODS FOR AN INTEGRATED VEHICLE AND STRUCTURE CHARGER

(71) Applicant: Toyota Motor North America, Inc., Plano, TX (US)

(72) Inventors: Norman Ning Lu, Fairview, TX (US); Ronnie Nomoto, Frisco, TX (US); Geoffrey David Gaither, Ann Arbor, MI (US)

(73) Assignees: Toyota Motor North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/142,225

(22) Filed: May 2, 2023

(65) Prior Publication Data
US 2024/0367544 A1  Nov. 7, 2024

(51) Int. Cl.
| | |
|---|---|
| *B60L 53/68* | (2019.01) |
| *B60L 53/16* | (2019.01) |
| *B60L 55/00* | (2019.01) |
| *B60L 58/12* | (2019.01) |
| *H02J 3/32* | (2006.01) |
| *H02J 7/00* | (2006.01) |

(52) U.S. Cl.
CPC ............ *B60L 53/68* (2019.02); *B60L 53/16* (2019.02); *B60L 55/00* (2019.02); *B60L 58/12* (2019.02); *H02J 3/322* (2020.01); *H02J 7/0068* (2013.01)

(58) Field of Classification Search
CPC .......... B60L 53/68; B60L 53/16; B60L 55/00; B60L 58/12; H02J 3/322; H02J 7/0068
USPC ................................................... 307/9.1–10.2
See application file for complete search history.

(56) References Cited

U.S. PATENT DOCUMENTS

| | | |
|---|---|---|
| 5,684,379 A | 11/1997 | Svedoff |
| 9,559,521 B1 * | 1/2017 | King ..................... H02J 9/06 |
| 10,933,761 B1 | 3/2021 | Lu et al. |

(Continued)

FOREIGN PATENT DOCUMENTS

| | | |
|---|---|---|
| EP | 4047782 A1 | 8/2022 |
| JP | 2013211947 A | 10/2013 |

(Continued)

*Primary Examiner* — Daniel Kessie
*Assistant Examiner* — Terrence R Willoughby
(74) *Attorney, Agent, or Firm* — Christopher G. Darrow; DARROW MUSTAFA PC

(57) ABSTRACT

Systems, methods, and other embodiments described herein relate to vehicle charging and supplying backup power to a structure while reducing system complexity (e.g., installation). In one embodiment, a system includes a charger including a charging circuit and a discharge circuit coupled to a charging connector for an electric vehicle (EV), and the charging connector is bi-directional. The system also includes that the charging circuit supplies an ingoing power from a main electric panel of a structure to the charging connector. The system also includes that the discharge circuit receives an outgoing power through the charging connector and splits the outgoing power in voltage levels using a transformer. The system also includes a manual transfer switch within the discharge circuit that feeds backup power using the voltage levels to a sub-panel for electrical circuits of the structure during a power interruption and the sub-panel is external from the charger.

20 Claims, 5 Drawing Sheets

(56) References Cited

U.S. PATENT DOCUMENTS

| | | | |
|---|---|---|---|
| 11,764,579 B1* | 9/2023 | Cooper | H02J 3/14 |
| | | | 307/29 |
| 2011/0202418 A1* | 8/2011 | Kempton | G06Q 50/06 |
| | | | 705/26.1 |
| 2014/0327408 A1 | 11/2014 | Ishii et al. | |
| 2015/0077054 A1 | 3/2015 | Uyeki | |
| 2022/0072971 A1 | 3/2022 | Allison et al. | |
| 2023/0231409 A1* | 7/2023 | Xu | B60L 55/00 |
| | | | 307/65 |
| 2023/0415602 A1* | 12/2023 | Salter | B60L 58/14 |

FOREIGN PATENT DOCUMENTS

| | | |
|---|---|---|
| JP | 2014200170 A | 10/2014 |
| JP | 2015122866 A | 7/2015 |
| JP | 2015208132 A | 11/2015 |
| KR | 20200060263 A | 5/2020 |
| WO | 2017033412 A1 | 3/2017 |

\* cited by examiner

SYSTEMS AND METHODS FOR AN INTEGRATED VEHICLE AND STRUCTURE CHARGER

TECHNICAL FIELD

The subject matter described herein relates, in general, to a charger for a vehicle and structure (e.g., home), and, more particularly, to a charger integrating units for charging a vehicle and supplying backup power to a structure that reduces system complexity.

BACKGROUND

Structures use generators to supply power during an outage caused by storms, blackouts, component failures, and so on. Such generators rely on fossil fuels (e.g., propane, natural gas, etc.) batteries, or similar energy sources to backup a structure (e.g., home, building, etc.) for limited periods. However, alternate energy sources are sometimes sought due to accessibility, environmental regulations, and so on. An alternative energy source being considered are electric vehicles (EV) as they become prevalent and battery capacity increases.

In various implementations, supplying power from an EV to a structure involves atypical connectors or line voltages. For example, an EV charger is unidirectional to recharge a vehicle and lacks the capabilities to back-feed power. Furthermore, an EV may output voltages (e.g., 240 Volts alternating-current (VAC), etc.) that are incompatible (e.g., direct current) with stationary circuits. As such, a structure may be installed with adapters (e.g., a power inlet) or additional electric subsystems for transferring power from an EV, thereby increasing system complexity (e.g., installation). In one approach, the EV outputs AC power that connects to a power input on the structure using an electrical cord. However, this system involves multiple (e.g., two) electrical installations for EV charging and backup power, thereby increasing cost and decreasing customer satisfaction.

SUMMARY

In one embodiment, example systems and methods relate to improving vehicle charging and supplying backup power to a structure while reducing system complexity (e.g., installation). In various implementations, a charger supplying power to an electric vehicle (EV) and backup power to a structure (e.g., home, building, etc.) involves complex installations having costly adaptors and subsystems. For example, an installation involves a transfer switch added to the structure and costly wiring (e.g., high-voltage cables, multi-line cables, etc.) from the transfer switch to a discharge circuit that interfaces with the vehicle charger. Furthermore, a system may involve extra cables and adaptors that connect from the EV to an inlet of the structure, thereby relying on additional hardware for supplying backup power.

Therefore, in one embodiment, a system has a charger that integrates a charging circuit and a discharge circuit having a transfer switch into an individual unit and supplies auxiliary power for a structure. The system may utilize a charging connector that is bi-directional such that the charging circuit supplies an ingoing power from a main electric panel of the structure to the EV. Furthermore, the discharge circuit receives an outgoing power through the charging connector to supply backup power to the structure during a power interruption (e.g., outage). In one approach, the discharge circuit has an integrated transformer that phase-splits the outgoing power (e.g., 240 Volts (V), 240 V alternating current (AC)) from the EV into voltage levels compatible with the structure (e.g., 120 VAC). The transfer switch may feed backup power from the transformer to a sub-panel external from the charger for electrical circuits of the structure during the power interruption. In other words, the transfer switch may be a circuit breaker that draws energy from the EV instead of the power company for the main electric panel. In addition, the charger may include a load monitor that measures outgoing current from the EV and the system optimally adjusts the outgoing power according to the outgoing current. Accordingly, the system implements a charger so that an EV supplies backup power for the structure without utilizing a power inlet and transfer switch on the electrical circuits, thereby reducing costs while increasing customer satisfaction.

In one embodiment, a system for vehicle charging and supplying backup power to a structure while reducing system complexity (e.g., installation) is disclosed. In one embodiment, the system includes a charger including a charging circuit and a discharge circuit coupled to a charging connector for an electric vehicle (EV), and the charging connector is bi-directional. The system also includes that the charging circuit supplies an ingoing power from a main electric panel of a structure to the charging connector. The system also includes that the discharge circuit receives an outgoing power through the charging connector and splits the outgoing power in voltage levels using a transformer. The system also includes a manual transfer switch within the discharge circuit that feeds backup power using the voltage levels to a sub-panel for electrical circuits of the structure during a power interruption and the sub-panel is external from the charger.

In one embodiment, a system for vehicle charging and supplying backup power to a structure while reducing system complexity (e.g., installation) is disclosed. In one embodiment, the system includes a charger including a charging circuit and a discharge circuit coupled to a charging connector for an electric vehicle (EV), and the charging connector is bi-directional. The system also includes that the charging circuit supplies an ingoing power from a main electric panel of a structure to the charging connector. The system also includes that the discharge circuit receives an outgoing power through the charging connector and splits the outgoing power in voltage levels using a transformer. The system also includes a manual switch of the charger that remotely controls a transfer switch associated with a sub-panel, and the discharge circuit feeds backup power using the voltage levels to the sub-panel for electrical circuits of the structure during a power interruption and the transfer switch associated with the sub-panel is external from the charger.

In one embodiment, a system for vehicle charging and supplying backup power to a structure while reducing system complexity (e.g., installation) is disclosed. In one embodiment, the system includes a charger including a charging circuit and a discharge circuit directly connected to a charging connector for an electric vehicle (EV), and the charging connector is bi-directional. The system also includes that the charging circuit supplies an ingoing power from a main electric panel of a structure to the charging connector, the charging circuit directly connected to the main electrical panel. The system also includes that the discharge circuit receives an outgoing power through the charging connector, the discharge circuit directly connected to the charging connector. The system also includes a manual transfer switch within the discharge circuit that feeds backup power using the outgoing power to a sub-panel for electrical circuits of the structure during a power interruption and the sub-panel is external from the charger.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving vehicle charging and supplying backup power to a structure while reducing system complexity (e.g., installation) are disclosed herein. In various implementations, a charger supplying power to an electric vehicle (EV) and backup power to a structure (e.g., home, building, etc.) involves acquiring costly adaptors for inlets and installing subsystems for interfacing between the EV and the structure. For example, an installation involves a transformer for converting outgoing power from the EV to a compatible voltage level and type (e.g., alternating current). The system may also have a transfer switch added to the structure and separate from the charger. This configuration involves costly wiring from the transfer switch to a discharge circuit for interfacing with the EV charging system. Therefore, in one embodiment, a system includes a charger that integrates a charging circuit and a discharge circuit having a transfer switch into an individual unit for EV charging and supplying auxiliary power that simplifies installation and reduces costs. Here, a charging connector that is bi-directional draws incoming power from the charging circuit and supplies outgoing power from the vehicle to a structure. In one approach, a transformer (e.g., center-tapped) integrated within the transformer is coupled to a charging connector from converting a single-phase 240 volts-alternating current (VAC) to a split-phase 240V power.

Moreover, a transfer switch integrated within the discharge circuit is coupled to the transformer or directly with the charging connector for structures supporting output powers from the EV. Here, the charger becomes a primary point for power transfer by integrating the transfer switch with other components, thereby simplifying installation and reducing costs. Furthermore, the transfer switch may be coupled to a sub-panel external from the charger. The sub-panel may selectively power circuits from the main panel to the home when the transfer switch engages during a power interruption. In one approach, the system implements a load monitor and a load manager for optimizing charger and EV performance. The load monitor measures outgoing currents from the EV for the electrical circuits individually and the charging connector receives the outgoing power adjusted according to the outgoing currents reported by the load monitor. For example, the load manager reduces the backup power when a charge remaining on the EV falls below a threshold (e.g., 5%). Thus, the system implements a charger that supplies backup power for the structure from an EV without utilizing a power inlet and installing a transfer switch on the sub-panel, thereby reducing costs while increasing customer satisfaction.

Figure 1:
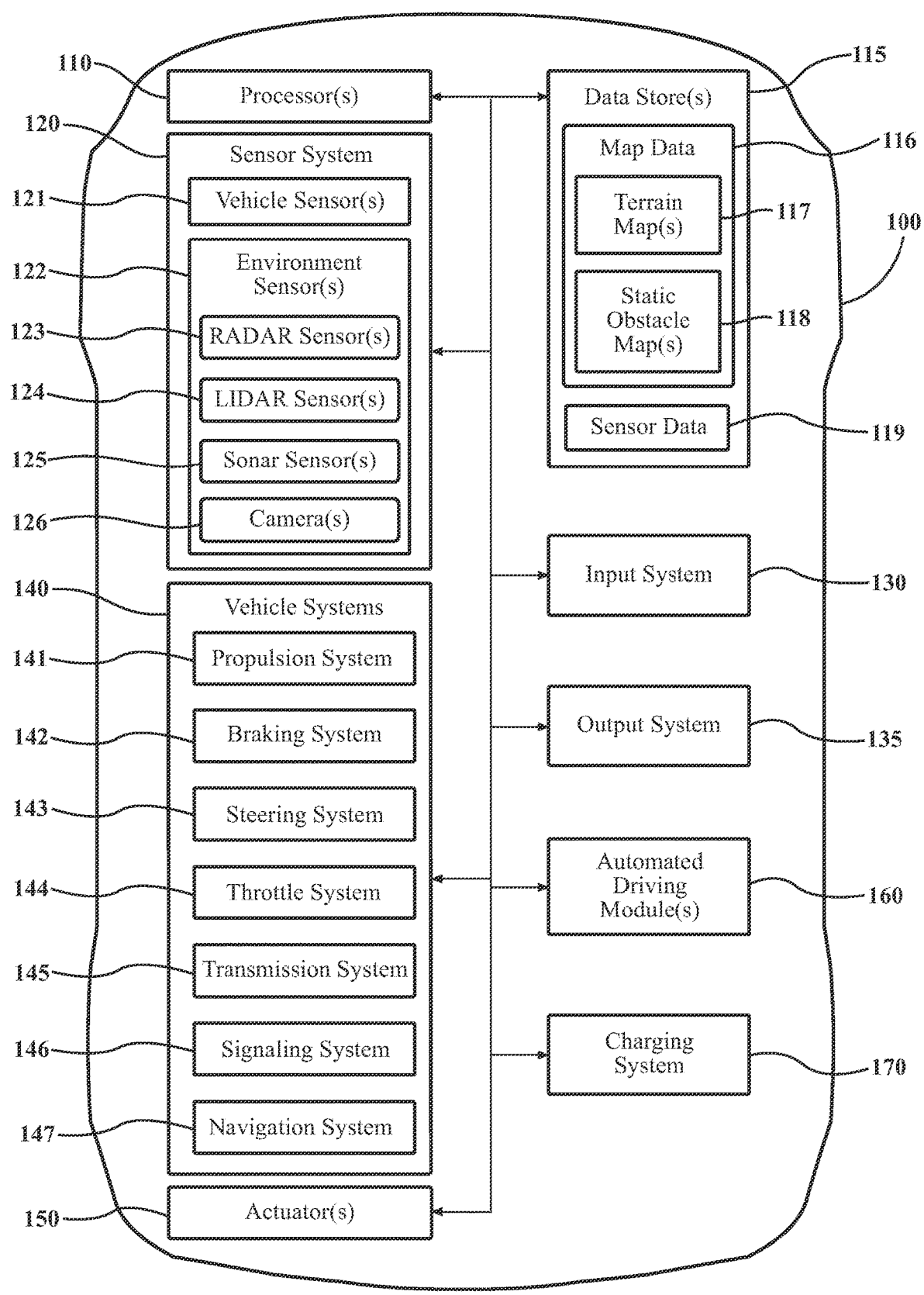
FIG. 1 illustrates one embodiment of a vehicle for supplying backup power to a structure.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a charging system 170 uses roadside units (RSU), consumer electronics (CE), mobile devices, robots, drones, and so on that benefit from the functionality discussed herein associated with vehicle charging and supplying backup power to a structure while reducing system complexity.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Figure 2:
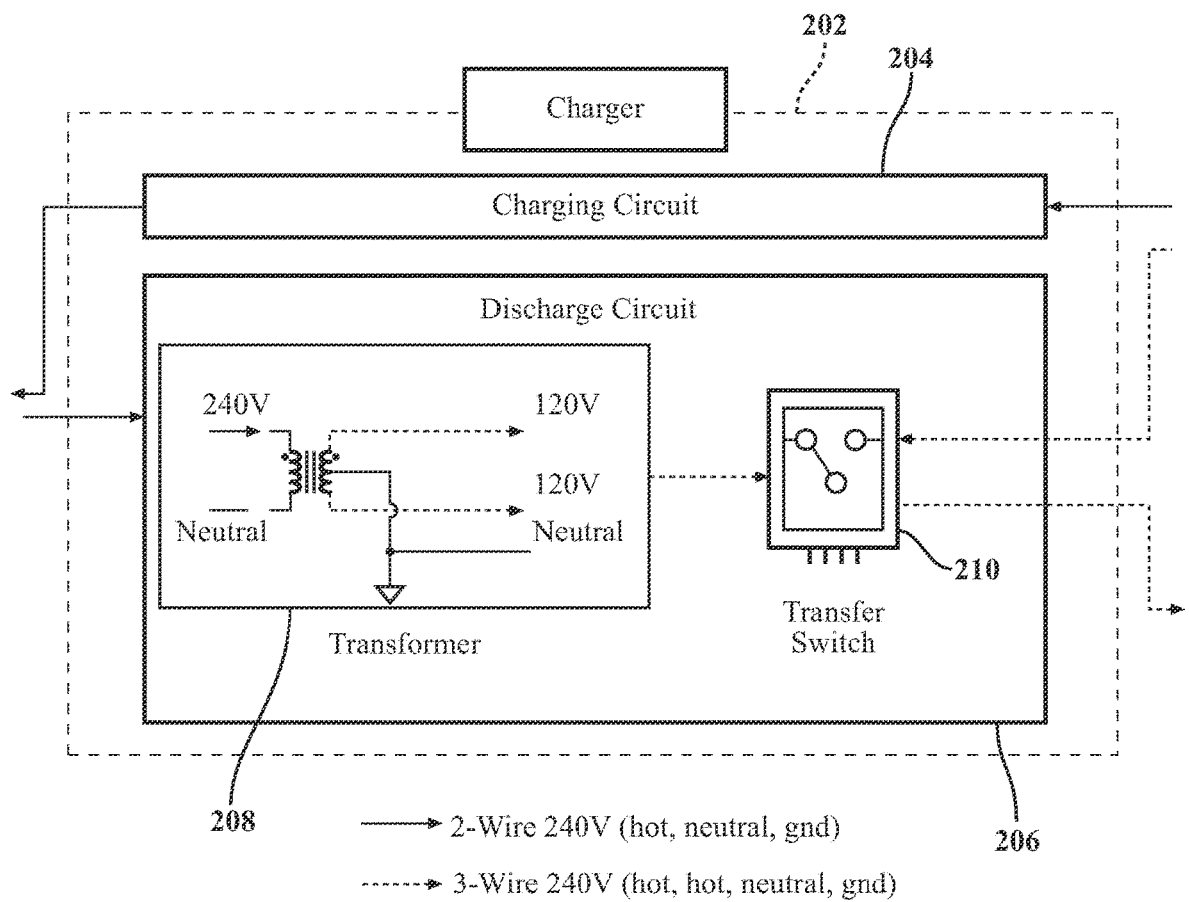
FIG. 2 illustrates one embodiment of a charger that integrates a charging circuit and a discharge circuit for electric vehicle charging and supplying outgoing power.

Now turning to FIG. 2, one embodiment of a charger that integrates a charging circuit and a discharge circuit for EV charging and supplying outgoing power is illustrated. In particular, a charger 202 integrates a charging circuit 204 with a discharge circuit 206 rather than having separate or standalone units for the circuits. For additional convenience and compatibility, in one embodiment, the discharge circuit 206 includes a transformer 208 (e.g., an automatic transformer, a variable transformer, etc.) for certain geographic regions and a transfer switch 210. Here, the charging circuit 204 supplies an ingoing power from a source to the charging connector, such as through a direct connection to the source. The output of the charging circuit 204 may couple or directly connect to a charging connector for the vehicle 100. In either case of charging or supplying backup power, the vehicle 100 may be an EV or plug-in hybrid EV (PHEV) having the charging system 170. In various implementations, the charging system 170 includes transformers, rectifiers, switches, and so on that supply AC and DC power to components within the vehicle 100.

Moreover, the ingoing power may utilize a 2-wire 240 V (e.g., hot, neutral, ground) feed on the charging connector. In one approach, the charging connector is bi-directional, thereby allowing an interface to both the charging circuit 204 and discharge circuit 206. In this way, the charger 202 can charge the vehicle 100 while functioning as a backup source for an external load with less cabling and components.

Moreover, the discharge circuit 206 receives an outgoing power through the charging connector. The vehicle 100 may also communicate control signaling for setting the discharge circuit 206 into a ready steady state to back-feed power. For example, the outgoing power utilizes a 2-wire 240 V/240 VAC (e.g., hot, neutral, ground, etc.) feed that is single-phase on the charging connector for backup power within certain regions (e.g., European countries) without a transformer conversion. Here, the vehicle 100 may output AC rather than direct current (DC) using a rectifier circuit in the charging system 170 of the vehicle 100, thereby avoiding extra components in the charger 202. As such, the outgoing power is generated as AC power independent of a rectifier on the charger 202 or the structure.

Regarding structures wired for reduced voltages, the charger 202 utilizes the transformer 208 for converting a single-phase voltage to two-phase for certain regions (e.g., United States, Japan, etc.). For example, the transformer is a center-tap transformer that splits 240 V outgoing from the vehicle 100 to a 3-wire 240 V (e.g., hot, hot, neutral, ground, etc.) output such that each hot wire is approximately 120 V. Furthermore, the transfer switch 210 switches the power source to the vehicle 100 when there is a power interruption associated with the primary source. As explained herein, the transfer switch 210 installed within the charger 202 creates a unitary and consolidated point for power transfer that avoids costly adapters and additional installation tasks at the structure. Otherwise, the charger 202 may need an external controller for interfacing between the power management system of the vehicle 100 and the transfer switch 210, thereby increasing costs and complexity. Also, the structure receives backup power from the discharge circuit 206 independent of a power inlet, thereby simplifying installations for vehicles and homes.

Figure 3:
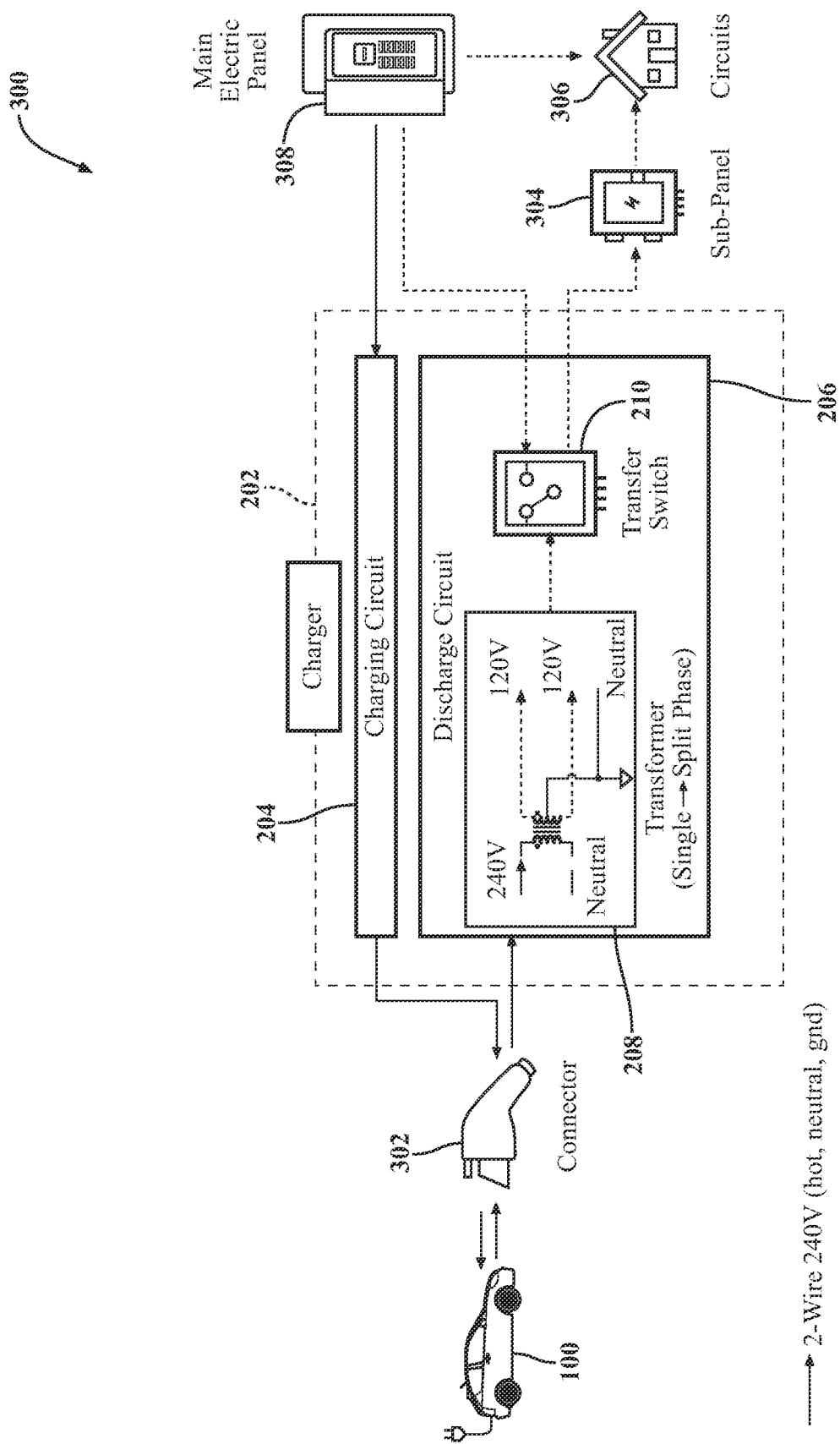
FIG. 3 illustrates one embodiment of a system that integrates a charging circuit and a discharge circuit for supplying power to a structure during power interruptions.

In various implementations, FIG. 3 illustrates one embodiment of a system 300 that integrates a charging circuit and a discharge circuit for supplying power to a structure during power interruptions. Here, the connector 302 is a bi-directional connector such as a society of automotive engineers (SAE) j-plug 1772 (J1772) that draws incoming power (e.g., 240 V) from the charging circuit 204 (e.g., a J1772 circuit) to the vehicle 100. As such, the connector 302 unitarily charges the vehicle 100 and supplies backup power to circuits 306 for a structure (e.g., home) during a power interruption or emergency, thereby avoiding additional cabling. In either case of charging or supplying backup power, the vehicle 100 may be an EV or plug-in hybrid EV (PHEV). As explained below, the connector 302 may feed outgoing power to the discharge circuit 206. The charging circuit 204 may be coupled or directly connected (e.g., absent intermediate switches, converters, etc.) to the main electric panel 308 for drawing the incoming power from a power grid (e.g., utility power). Furthermore, the transfer switch 210 is integrated within the discharge circuit 206 and feeds backup power using a single or split-phase source from the vehicle 100. The transfer switch 210 may be coupled or directly connected (e.g., absent intermediate switches, converters, etc.) to the sub-panel 304 that interfaces circuits between the main electric panel 308 and electrical circuits in the circuits 306 during a power interruption. In other words, the transfer switch 210 may be a circuit breaker that draws energy from the vehicle 100 instead of the power company through the main electric panel 308.

Regarding the sub-panel 304, the system 300 has this unit external from the charger 202 for universal and flexible installations. For example, the system 300 includes a subset or substantially the same circuits as those in the main electric panel 308 implemented within the sub-panel 304. In this way, the system 300 having the sub-panel 304 external from the charger 202 allows configurations tailored for circuits and wiring layouts within the main electric panel 308.

Referring again to the discharge circuit 206 and back-feeding through system 300, the transformer 208 (e.g., an automatic transformer, a variable transformer, etc.) may receive 240 V power from the vehicle 100 using the connector 302. The vehicle 100 may also communicate control signaling for setting the discharge circuit 206 into a ready steady state to back-feed power through a network interface. Such an interface may be a controller area network (CAN), a local area network (LAN), a wired network (e.g., ethernet), a wireless network (e.g., 802.11x), and so on. Furthermore, the 240 V power may be single-phase 240 VAC power that the transformer 208 converts into split-phase 240 VAC power. Here, the vehicle 100 may output AC rather than DC using a rectifier circuit in the charging system 170 of the vehicle 100, thereby avoiding extra components in the charger 202. In one approach, the transfer switch 210 is a manual transfer switch that receives the output from the transformer 208 for supplying 120 V and 240 V power to the sub-panel 304. For example, a manual transfer switch uses break-before-make logic to break (i.e., open) circuits in the main electric panel 308 before engaging (i.e., closing) the sub-panel 304. In this way, a manual transfer switch prevents a simultaneous connection between old and new current paths that can cause surges from excessive line charges. The manual transfer switch also maintains a balance between the 120 VAC phases when coupled or directly connected (e.g., absent intermediate switches, converters, etc.) to the transformer 208. Accordingly, the circuits 306 draws power from the sub-panel 304 during a power interruption or an emergency instead of the power grid through the main electric panel 308.

Figure 4:
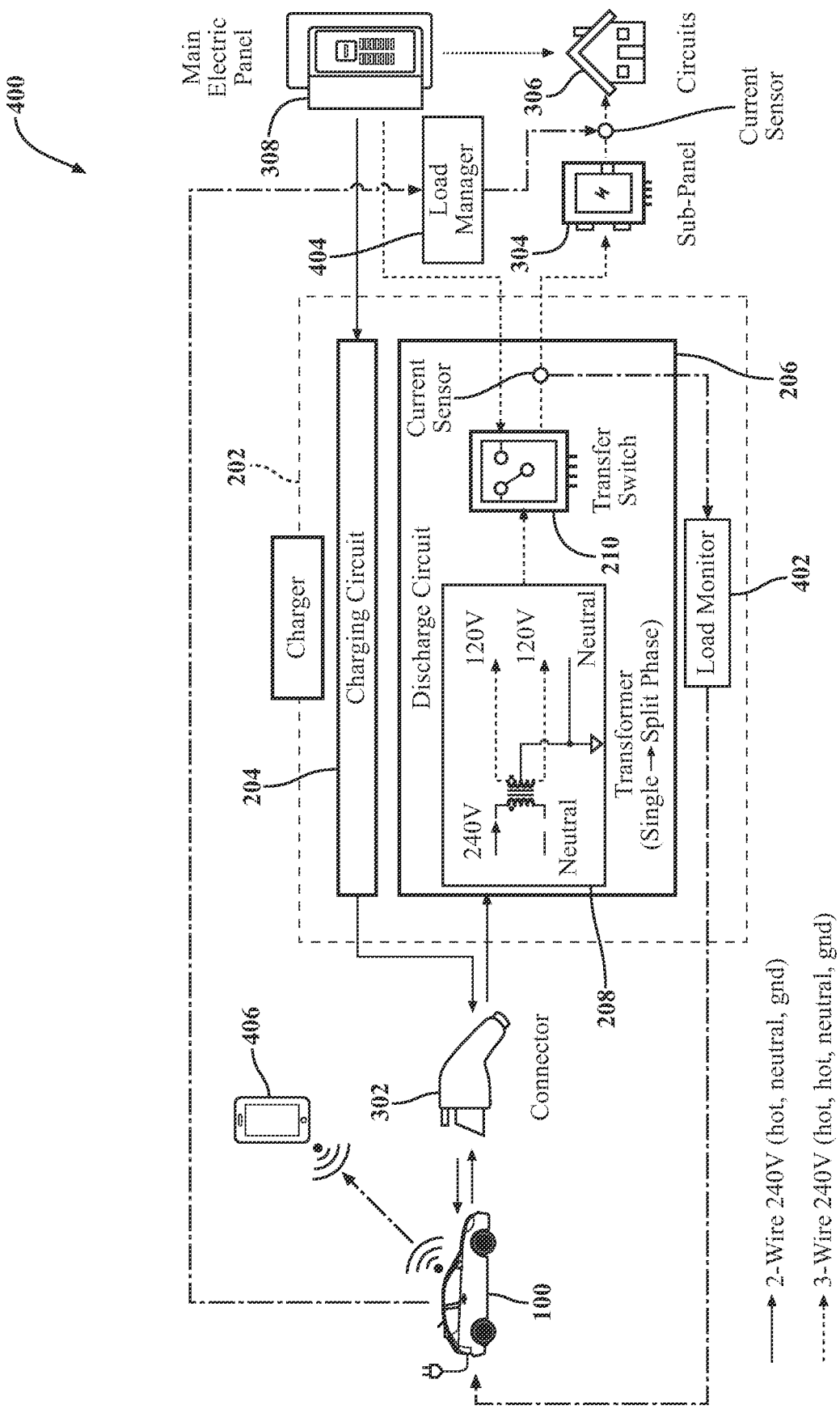
FIG. 4 illustrates one embodiment of the system of FIG. 3 utilizing a load monitor and a load manager to optimize incoming and outgoing power from the structure.

Now turning to FIG. 4, one embodiment of the system of FIG. 3 utilizing a load monitor and a load manager to optimize incoming and outgoing power from the structure is illustrated. In system 400, a vehicle-to-load (V2L) charging may involve a structure (e.g., home, building, etc.) experiencing power interruption (e.g., outage, emergency, etc.). Here, the charger 202 has a load monitor 402 embedded as software that communicates various parameters (e.g., battery charge, run-time, etc.) when the vehicle 100 powers an external load. For example, the load monitor 402 measures the outgoing currents on branch circuits individually, a total of downstream loads, and so on. These measurements are communicated as feedback to the vehicle 100. The charging system 170 in the vehicle 100 can utilize the feedback for adjusting the outgoing power. For example, the charging system 170 communicates instructions to the load manager 404 for reducing power on the sub-panel 304. The instructions may be triggered by remaining run-time, charge remaining, upcoming trips, proximity to charging stations, and so on associated with the vehicle 100. Resultingly, the charging connector 302 receives the outgoing power adjusted according to the outgoing currents reported by the load monitor 402.

In another embodiment, the load monitor 402 measures outgoing currents on each branch circuit individually, a total of the downstream loads, and so on and communicates that information to the vehicle 100 or the mobile device 406 through a network interface. Such a network interface may be a CAN, a LAN, a wired network (e.g., ethernet), a wireless network (e.g., 802.11x), and so on. The output system 135 (e.g., a screen) may display the information on a human-machine interface (HMI) or a remote application after computations by the processor(s) 110. For example, the processor(s) 110 compute a consumption rate, remaining run-time, a state of charge (SOC), and a driving range associated with an electric mode for the vehicle 100 from the information. Thus, an operator of the vehicle 100 can monitor the charger 202 and adjust outgoing/incoming power by commanding the charging system 170.

Figure 5:
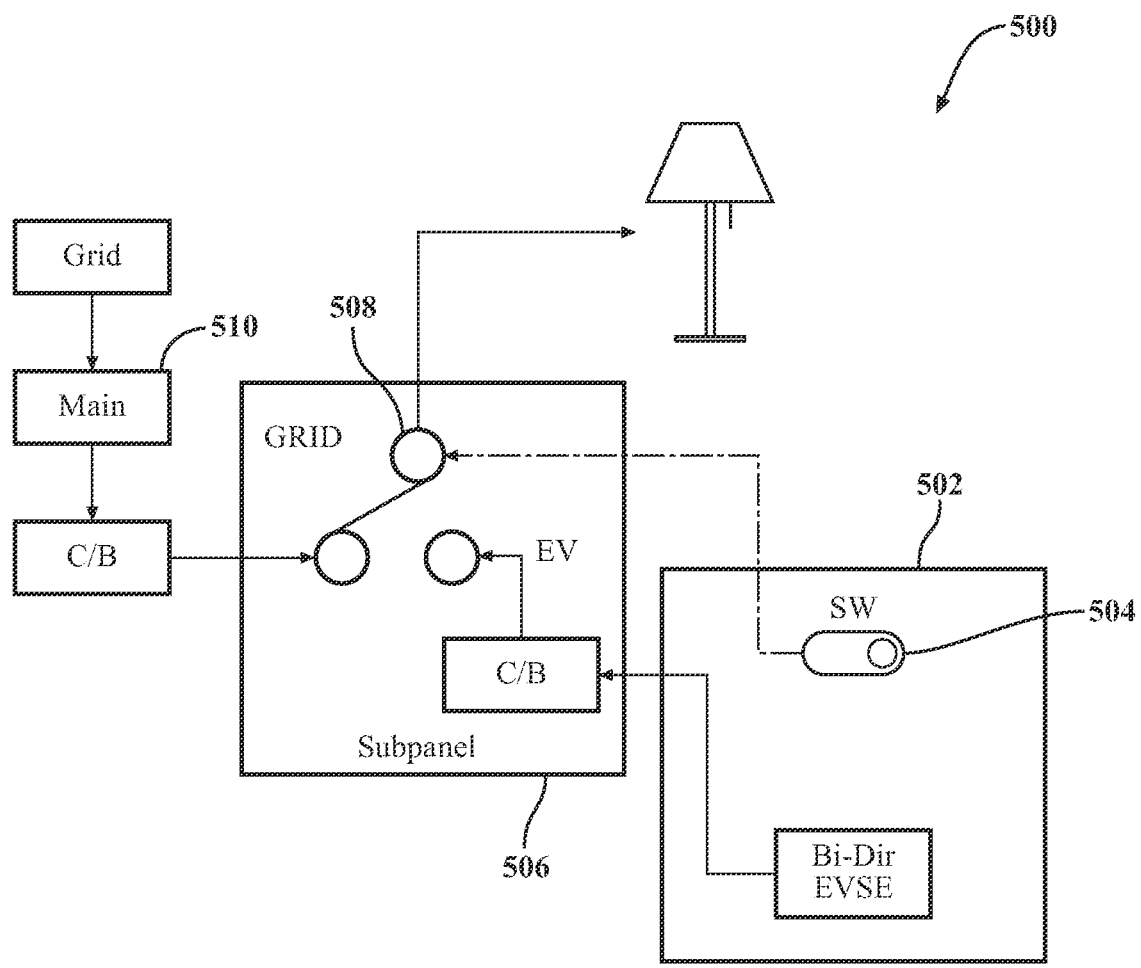
FIG. 5 illustrates one embodiment of a system that integrates a charging circuit and a discharge circuit using remote activation of a transfer switch during power interruptions.

Now turning to FIG. 5, one embodiment of a system 500 that integrates a charging circuit and a discharge circuit using remote activation of a transfer switch during power interruptions is illustrated. Here, the charging connector 502 includes a bi-directional (Bi-Dir) EV supply equipment (EVSE) that interfaces with the charging system 170. The Bi-Dir EVSE may use battery or vehicle power when available to communicate and establish power transfer with the vehicle 100 and the charging system 170 during power interruptions. Furthermore, the charging connector 502 also includes a remote switch 504 having a network interface to communicate commands with a sub-panel 506. Such an interface may be a controller area network (CAN), a local area network (LAN), a wired network (e.g., ethernet), a wireless network (e.g., 802.11x), and so on powered by the battery or the vehicle 100. In one approach, the charging connector 502 may be coupled or directly connected with the sub-panel 506, thereby simplifying installation.

Moreover, in various implementations, the sub-panel 506 includes a transfer switch 508 that receives the commands from the remote switch 504. The command may initiate an islanding function that safely initiates a discharge from the vehicle 100 to the sub-panel 506. In this way, the transfer switch 508 is controlled remotely by a switch on the charger connector 502 rather than having switches in a charging unit. In one approach, the transfer switch 508 functions automatically for defaulting to the Bi-Dir EVSE-supplied circuit when de-energized by the grid. Here, a load is ready to receive electricity from the EVSE once connected. Once grid power is restored, the load then defaults back to grid-powered settings, thereby improving convenience.

In various implementations, the system 500 configuration avoids additional wiring for individual circuits the transfer switch 508 is supplying through the charging unit. In particular, the system 500 saves on component costs when the charger unit is installed a substantial distance from the main circuit 510 with proximity to the sub-panel 506. Furthermore, this configuration avoids the system 500 from making connections with complex and costly cables (e.g., four-wires cables, thick cables, etc.). Accordingly, the system 500 reduces complexity by utilizing less cables and communications through the remote switch 504, thereby improving system efficiency.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s)

117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the charging system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100.

The processor(s) 110, the charging system 170, and/or the automated driving module(s) 160 can be operatively connected to communicate with the various vehicle systems 140 and/or individual components thereof. For example, returning to FIG. 1, the processor(s) 110, the charging system 170, and/or the automated driving module(s) 160 can be in communication to send and/or receive information from the various vehicle systems 140 to control the movement of the vehicle 100. The processor(s) 110, the charging system 170, and/or the automated driving module(s) 160 may control some or all of the vehicle systems 140.

The processor(s) 110 and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110 and/or the automated driving module(s) 160 can control the direction and/or speed of the vehicle 100. The processor(s) 110 and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a LAN or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
a charger including a charging circuit and a discharge circuit coupled to a charging connector for an electric vehicle (EV), and the charging connector is bi-directional;
the charging circuit supplies an ingoing power from a main electric panel of a structure to the charging connector;
the discharge circuit receives an outgoing power through the charging connector and splits the outgoing power in voltage levels using a transformer; and
a manual transfer switch directly integrated within the discharge circuit that feeds backup power using the voltage levels to a sub-panel for electrical circuits of the structure during a power interruption, and the sub-panel is external from the charger and the manual transfer switch and the discharge circuit are located within the charger.

2. The system of claim 1, wherein the outgoing power is a single-phase and volts alternating current (VAC) source from the EV and the transformer is a center-tap transformer that outputs a split-phase of the outgoing power, the outgoing power supplied by multiple hot-wires and a neutral wire, and the charger integrates the charging circuit and the discharge circuit into a single unit.

3. The system of claim 1 further comprising a load monitor that measures outgoing currents from the EV for the electrical circuits individually and the charging connector receives the outgoing power adjusted according to the outgoing currents reported by the load monitor.

4. The system of claim 3 further comprising a load manager to reduce the backup power associated with charge remaining on the EV, and the charger integrates the charging circuit and the discharge circuit entirely into a single unit.

5. The system of claim 1 further comprising:
a load monitor that measures outgoing currents for the electrical circuits individually and the load monitor communicates information associated with the outgoing currents; and
a network interface of the EV communicates the information for display on a remote application having a human-machine interface (HMI).

6. The system of claim 5, wherein a processor of the EV computes one of a consumption rate, remaining run-time, a state of charge (SOC), and a driving range associated with the EV from the information.

7. The system of claim 1, wherein the outgoing power is generated as alternating current (AC) power independent of a rectifier on the charger.

8. The system of claim 1, wherein the charging connector and the charging circuit are j-plug compliant.

9. The system of claim 1, wherein the structure receives the backup power from the discharge circuit independent of a power inlet on the structure.

10. A system comprising:
a charger including a charging circuit and a discharge circuit coupled to a charging connector for an electric vehicle (EV), and the charging connector is bi-directional, and the charging circuit and the discharge circuit are integrated within the charger in a single unit;
the charging circuit supplies an ingoing power from a main electric panel of a structure to the charging connector;
the discharge circuit receives an outgoing power through the charging connector and splits the outgoing power in voltage levels using a transformer; and
a manual switch of the charger that remotely controls a transfer switch associated with a sub-panel, and the discharge circuit feeds backup power using the voltage levels to the sub-panel for electrical circuits of the structure during a power interruption and the transfer switch associated with the sub-panel is external from the charger.

11. The system of claim 10, wherein the outgoing power is a single-phase and volts alternating current (VAC) source from the EV and the transformer is a center-tap transformer that outputs a split-phase of the outgoing power, the outgoing power supplied by multiple hot-wires and a neutral wire, and the transfer switch is located within the discharge circuit.

12. The system of claim 10 further comprising the charger having a controller with instructions to generate a signal to remotely control the transfer switch upon engagement of the manual switch.

13. The system of claim 10, wherein the outgoing power is generated as alternating current (AC) power independent of a rectifier circuit on the charger.

14. The system of claim 10, wherein the structure receives the backup power from the discharge circuit independent of a power inlet on the structure.

15. A system comprising:
a charger including a charging circuit and a discharge circuit directly connected to a charging connector for an electric vehicle (EV), and the charging connector is bi-directional;
the charging circuit supplies an ingoing power from a main electric panel of a structure to the charging connector, the charging circuit directly connected to the main electrical panel;
the discharge circuit receives an outgoing power through the charging connector, the discharge circuit directly connected to the charging connector; and
a manual transfer switch directly integrated within the discharge circuit that feeds backup power using the outgoing power to a sub-panel for electrical circuits of the structure during a power interruption and the sub-panel is external from the charger, and the manual transfer switch and the discharge circuit are located within the charger.

16. The system of claim 15 further comprising a center-tap transformer within the discharge circuit that converts the outgoing power from single-phase to split-phase voltage levels, the outgoing power supplied with multiple hot-wires and a neutral wire, the center-tap transformer is directly connected to the charging connector and the manual transfer switch, and the charger integrates the charging circuit and the discharge circuit into a single unit.

17. The system of claim 15 further comprising a load monitor that measures outgoing currents from the EV for the electrical circuits individually and the charging connector receives the outgoing power adjusted according to the outgoing currents.

18. The system of claim 17 further comprising a load manager to reduce the backup power associated with charge remaining on the EV.

19. The system of claim 15, wherein the outgoing power is generated as alternating current (AC) power independent of a rectifier on the charger.

20. The system of claim 15, wherein the structure receives the backup power from the discharge circuit independent of a power inlet on the structure.

* * * * *